United States Patent [19]

Blom

[11] Patent Number: 4,977,803
[45] Date of Patent: Dec. 18, 1990

[54] SAW MECHANISM FOR LOGS CONVOLUTELY WOUND ON CORES AND METHOD

[75] Inventor: Lawrence E. Blom, Coleman, Wis.

[73] Assignee: Paper Converting Machine Company, Green Bay, Wis.

[21] Appl. No.: 372,308

[22] Filed: Jun. 27, 1989

[51] Int. Cl.[5] .................... B26D 3/16; B65G 17/46
[52] U.S. Cl. ........................................ 83/23; 83/54;
83/151; 83/409; 198/693; 198/734; 198/803.12
[58] Field of Search ................ 83/13, 23, 37, 54, 329,
83/330, 151, 109, 409, 409.2; 198/803.12, 734,
733, 692, 693; 414/DIG. 910

[56] References Cited

U.S. PATENT DOCUMENTS

| | | | |
|---|---|---|---|
| 2,319,280 | 5/1943 | Widell | 198/803.12 X |
| 3,057,457 | 10/1962 | Johnson | 198/803.12 X |
| 3,213,731 | 10/1965 | Renard | 83/329 X |
| 3,537,570 | 11/1970 | Sillars | 198/803.12 X |
| 3,938,671 | 2/1976 | Lewey et al. | 414/910 X |
| 4,041,813 | 8/1977 | Spencer | 83/329 X |
| 4,821,613 | 4/1989 | Hertel | 83/13 |
| 4,827,816 | 5/1989 | Takaniemi | 83/54 X |

FOREIGN PATENT DOCUMENTS 766091 8/1967 Canada .................................. 83/329

Primary Examiner—Frank T. Yost
Assistant Examiner—Rinaldi Rada
Attorney, Agent, or Firm—Tilton, Fallon, Lungmus & Chestnut

[57] ABSTRACT

A saw mechanism for logs convolutely wound on cores and method wherein the upstream end of the log has its core supported on a support member attached to a log-advancing pusher, the chain carrying the pushers being equipped with stripper plates immediately downstream of the pushers to strip trim annuli from the pusher support members incident to arcuate movement of the stripper plate around the chain tail sprocket.

9 Claims, 3 Drawing Sheets

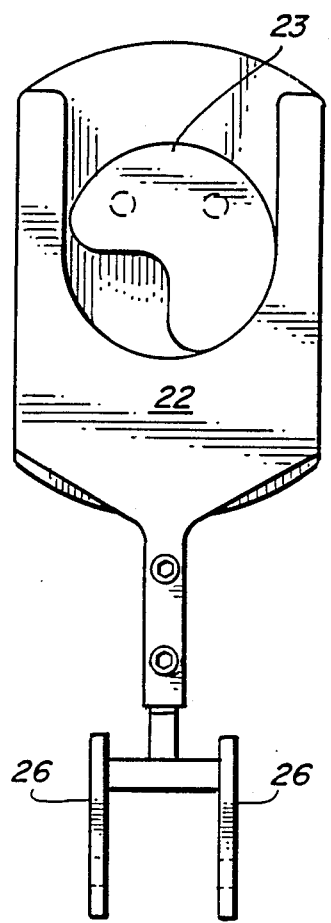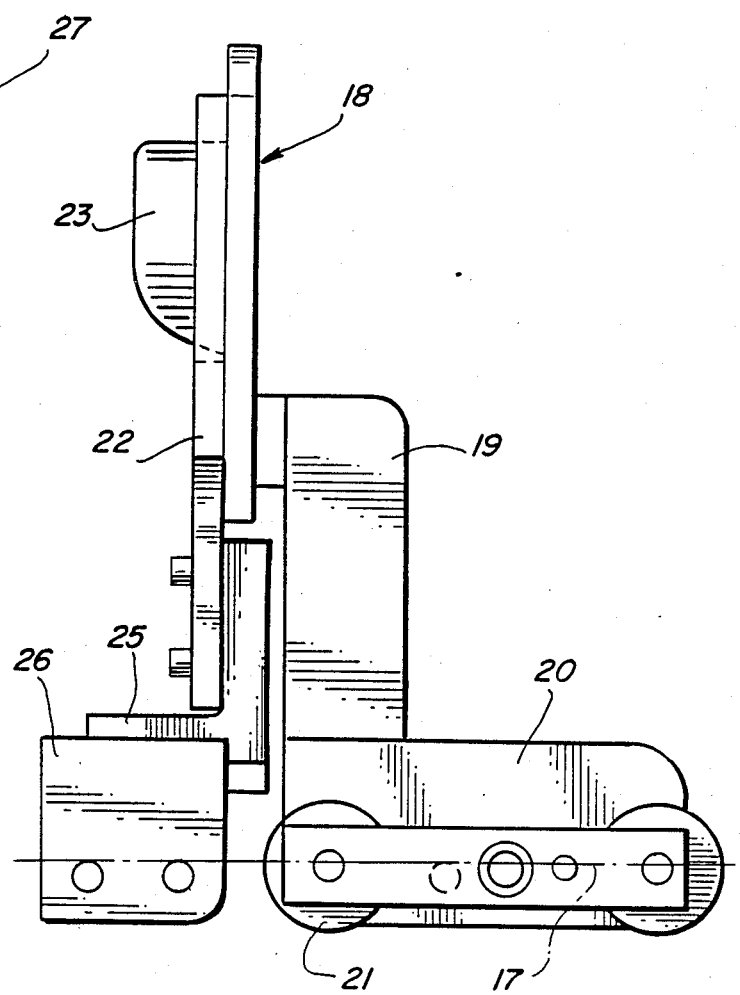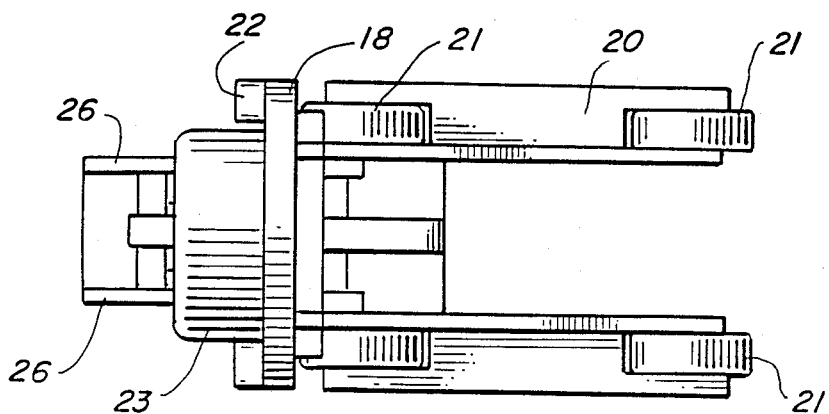

SAW MECHANISM FOR LOGS CONVOLUTELY WOUND ON CORES AND METHOD

BACKGROUND AND SUMMARY OF INVENTION

This invention relates to a saw mechanism for logs convolutely wound on cores and method, and more particularly to a movable disc blade saw which transversely severs elongated logs into retail-size rolls wherein the inventive minimizes log deflection incident to cutting forces.

Exemplary of the type of saw to which the invention pertains is co-owned U.S. Pat. No. 4,821,613. Reference may be made thereto for the background of log sawing and additional details may be seen in co-owned U.S. Pat. No. 4,041,813.

Briefly, for about the last 40 years, paper rolls such as toilet tissue and kitchen toweling webs have been rewound into elongated logs having the diameter of a retail-size roll. These logs were advanced axially past an oscillating or orbiting blade which cut the log into roll segments.

As an illustration, many rewinders were nominally 90" wide so as to provide twenty 4½" wide toilet tissue rolls. Normally, toweling rolls are 11" wide. In any event, the actual web being rewound into the retail-size roll diameter log was slightly wider than the nominal width—to provide a "trim" portion, thereby avoiding uneven edges. Normally the overall width of the untrimmed web for a 90" rewinder is about 93", permitting a trim of approximately 1½" at each side of the web, i.e., an annulus having a width of about 1½" when the trim was removed in the log saw. This trim cutting posed a problem of long standing which has been solved by the instant invention.

The problem is that the last roll cut from the log often shows poor cut quality. This is particularly the case when the roll is softly wound and the core and log compressed due to the cutting forces. The resulting cuts are typically biased, i.e., not perpendicular to the roll center line. The result of this problem is immediately apparent—the last roll may not be of conventional quality and therefore might have to be discarded. Where the log was a "twenty count" log, i.e., 90", this meant jettisioning 5% of the production. Even more importantly, this meant obstruction of the smooth production flow and the obstruction cost often was significant.

The instant invention solved this problem by adding a core support to the log pusher. Here it will be appreciated that for the many years of log sawing, the logs were advanced in troughs so as to pass by the intermittently cutting disc blade. The upstream end of the log was engaged by a pusher, normally carried by an endless chain so as to advance the log past the rotating blade.

By adding the core support to the log pusher, the trim piece (or last roll) can be better supported to minimize the deflections due to the cutting forces. A simple but highly effective mechanism for withdrawing the support out of the core after cutting is provided by fixing a stripper plate to a link in the pusher chain. The link position for the stripper plate is located downstream from the pusher attachment point so that the stripper plate pivots around the chain sprocket before the pusher—thus displacing itself ahead of the pusher. This then strips the trim annulus from the support carried by the pusher—for disposal from the production line.

An additional advantage stems from the employment of the support for the upstream end of the log. This involves the support of the core and therefore the roll itself against undue deflection from the blade entering the periphery of the log. This is particularly helpful where the logs are advanced continuously and the rotating blade also is advanced during the cut. Details of this mechanism can be seen in previously mentioned U.S. Pat. No. 4,041,813. Because the blade is moving axially of the log, there is an initial force applied to the log which is at an angle to the transverse plane of the resulting cut. This is substantially resisted by the pusher support of the invention.

Other objects and advantages of the invention may be seen in the details of construction and operation set forth in the ensuing specification.

The invention is described in conjunction with an illustrative embodiment in the accompanying drawing, in which—

FIG. 1 is a fragmentary perspective view of a portion of a log saw featuring the inventive pusher-support-stripper plate arrangement;

FIGS. 2-5 constitute a sequence of side elevational views, essentially schematic, which show the relative actions of the pusher and stripper plate;

FIG. 6 is an end elevational view (taken from the downstream side) of the stripper plate and pusher;

FIG. 7 is a side elevational view of the portion of the apparatus seen in FIG. 6; and FIG. 8 is a top plan view of the apparatus portion of FIG. 7.

DETAILED DESCRIPTION

Again reference is made to U.S. Pat. No. 4,821,613 to show the essential environment in which the invention applies. There, it will be seen that a generally rectangular, box-like frame supports an orbiting, rotating disc blade. Extending through the frame and supported thereby are a pair of troughs, the length of which is transverse to the orbital plane of the saw.

Figure 1:
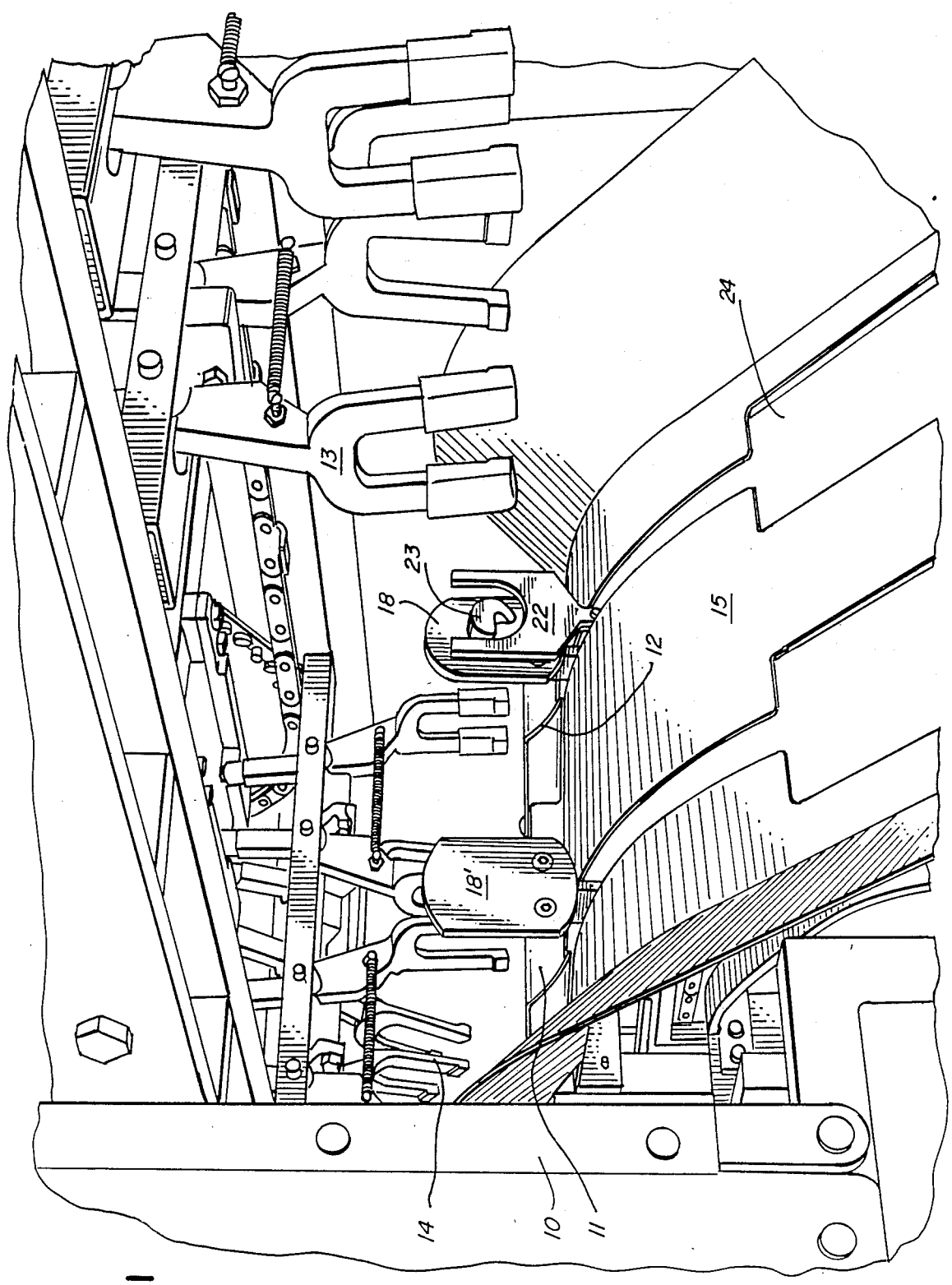

The frame is seen fragmentarily as at 10 in FIG. 1 and the troughs at 11 and 12. Two toughs are normally employed so as to balance the transverse cutting forces.

In the illustration given, the log saw was set up for testing at commercial speeds ranging between 100 to 300 cuts per minute. The inventive arrangement of pusher support-stripper plate was provided for only one trough so as to develop a ready comparison of the effectiveness of the invention by providing both supported and unsupported trim annuli under the same operating conditions.

Also seen in FIG. 1 are roll pickers or grippers as at 13 and 14. These grip the roll after cutting to transport it horizontally to packaging apparatus (not shown). These pickers operate at the point where the endless pusher chain passes around the tail sprocket which, in FIG. 1, is masked by the guard 15. The tail sprocket is schematically represented as at 16 in FIG. 2.

Figure 2:
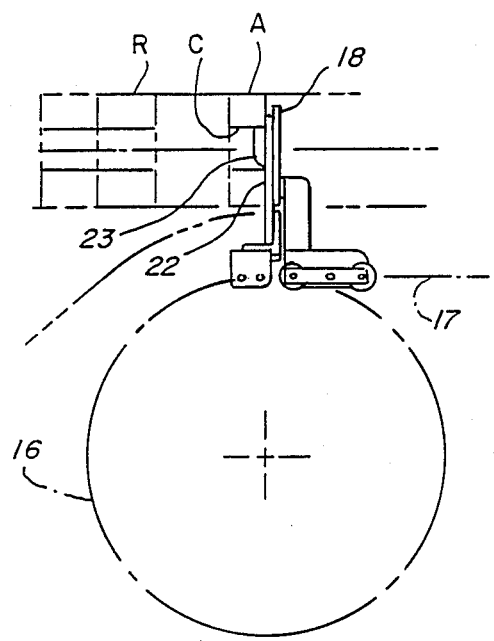

Still referring to FIG. 2, the endless chain is schematically represented as at 17 and, at its upstream end, passes around a head sprocket (not shown). Also not shown but conventional in this art, are means for driving the head sprocket so as to advance the chain and the pushers therewith. Illustrative of the conventional prior art pusher is the showing at the left side of FIG. 1 where the pusher is designated 18'; the right hand pusher being constructed according to the invention and designated 18.

The conventional prior art way of mounting the pushers is seen in FIG. 7 where the pusher plate 18 is secured to a bracket 19 upstanding from a carriage 20 mounted on the chain 17. Rollers at 21 are rotatably mounted on the carriage 20 to ride in tracks on the frame so as to guide the pushers. It will be appreciated that a plurality of spaced apart pushers are provided on the chain suitably spaced to receive the length of log being processed and coordinated with the cycle of movement of the log saw.

The Inventive Pusher Support-Stripper Plate

Reference is now made to FIGS. 2-5. These views illustrate the sequence of operation of the invention. The view in FIG. 2 shows the position of the pusher 18 and the stripper plate 22 shortly after the cut. The stripper plate 22 can be seen in the right central portion of FIG. 1 as well. Inasmuch as the pickers 13 advance ⅓ faster than the pushers 18, the last completed roll R (see FIG. 2) is spaced downstream from the trim annulus A. This much is conventional. However, new to the operation is the provision of the pusher support 23 member which has already been inserted into the core C of the annulus A.

Figure 3:
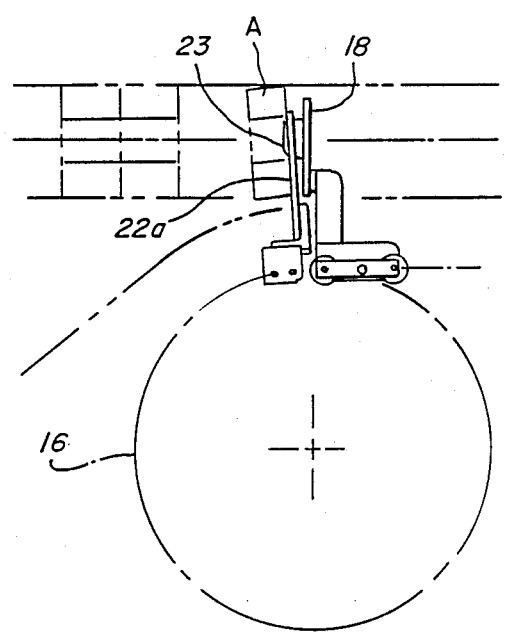

Now referring to FIG. 3 which illustrates the condition a short time after that illustrated in FIG. 2, it will be seen that the stripper plate (now designated 22a) has started its arcuate path around the sprocket 16 and has become separated from the pusher 18. This results in a displacement of the annulus A from the pusher 18 so that less of the support 23 is within the core C.

Figure 4:
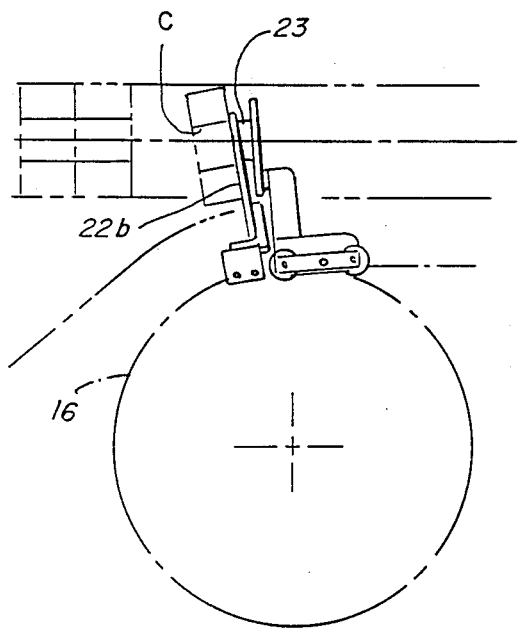

Now referring to FIG. 4, the view illustrates the condition of the inventive elements a short time after that depicted in FIG. 3 and there it will be seen that very little of the support member 23 is still inserted in the core C. This is due to the further angularity of the pusher plate as illustrated at 22b—the pusher plate 22 moving in the arcuate path ahead of the pusher 18.

Figure 5:
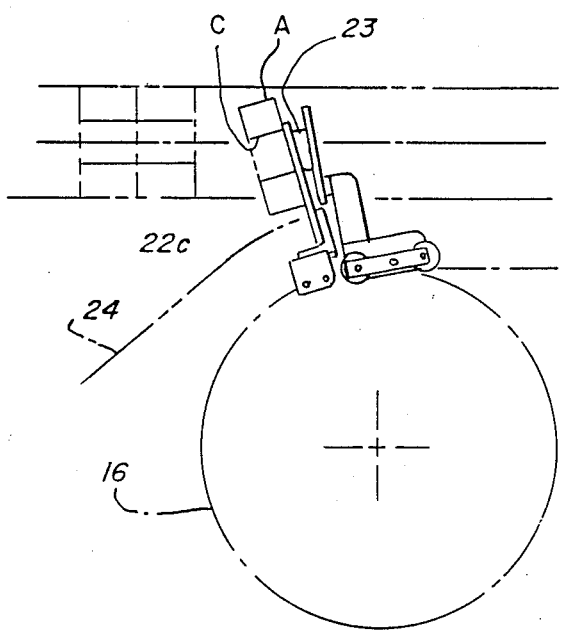

Lastly, in FIG. 5, the support member 23 is out of the core C by virtue of the further advance of the stripper plate to the position 22c. At this point in time, the annulus A is unsupported and falls to the floor either by moving down the guard 15 or through the openings 24 which are provided in the guard so as to permit the pushers to pass around the sprocket 16.

Now referring to the second drawing sheet and FIGS. 6-8, it will be seen that the stripper plate 22 is secured to an angle bracket or clip 25 which in turn carries plates 26 pivotally mounted on the chain 17.

Also seen clearly in FIG. 6 is the contour of the support member 23 which I consider preferable. This is essentially "kidney shaped" in end elevation and is particularly effective to resist biasing of deflecting forces applied when the log saw enters in the direction of the arrow designated 27 in FIG. 6.

More particularly, the support member 23 is constructed to have an arcuate outer contour conforming to the interior of the core C. This aids in resisting the saw blade deflection forces. However, the length of the support member 23 is less than the width of the contemplated annulus A.

To assist in annulus removal, I construct the stripper plate 22 with a height sufficient to engage the upper side of the log as can be appreciated from a comparison of FIGS. 2 and 6. In FIG. 6, it is seen that the stripper plate 22 has upwardly-extending arm portions to flank the support member 23, viz., being generally U-shaped.

While in the foregoing specification a detailed description of an embodiment of the invention has been set down for the purpose of illustration, many variations in the details hereingiven may be made by those skilled in the art without departing from the spirit and scope of the invention.

I claim:

1. A saw mechanism for logs convolutely wound on cores having upstream and downstream ends comprising: a frame, conveyor means for longitudinally advancing a series of logs along a horizontal path in said frame, blade means rotatably mounted on said frame, means on said frame for moving said blade means to intersect said path to transversely sever said log into retail-size rolls, a trough on said frame defining said path, an elongated slot in said trough, a sprocket-equipped endless chain on said frame below said trough, said chain having a plurality of links and with spaced apart individual links being equipped with carriage means, a pusher mounted on each carriage means for engaging the upstream ends of said logs for advancing the same, each pusher being equipped with a horizontally extending support member adapted to enter the upstream end of said core to support said log against cutting incident to severing the last roll from said log, and a stripper for each pusher mounted on a link of said chain downstream of its associated pusher whereby when said chain passes around a sprocket, said stripper is adapted to remove a trim annulus from said support member.

2. The structure of claim 1 in which said stripper is essentially U-shaped to flank said support member.

3. The structure of claim 1 in which said support member is essentially kidney-shaped so as to provide additional support against deflection forces arising from the initial engagement of said blade with a log.

4. A saw mechanism for logs convolutely wound on cores having upstream and downstream ends comprising a frame, a pair of longitudinally slotted elongated troughs in said frame providing a horizontal path for logs to be transversely severed into retail-size rolls, saw means operatively associated with said frame for transversely severing said logs, an endless chain for each trough, log pusher means mounted on said chain and extending into each said trough, a support member mounted on each pusher means adapted to enter the upstream end of each log core and a stripper plate on said chain for each pusher means positioned just forward of each pusher means in the direction of log movement, each endless chain having a plurality of links, carriage means supported on a single link for carrying said pusher means and bracket means connected to a link forward in the direction of log travel of said single link for carrying said stripper plate.

5. The structure of claim 4 in which each stripper plate is sized and constructed to extend upwardly a distance sufficient to engage the upper side of a log being advanced.

6. The structure of claim 5 in which each stripper plate is generally U-shaped to provide arm portions flanking said support member.

7. A method of sawing logs convolutely wound on cores comprising advancing said logs along a horizontal path past saw means, moving said saw means across said path to transversely sever each log into retail-size rolls, supporting the upstream end of each log while the same is being advanced in said path by inserting a support member into the log core and, after the last severing of a log to provide a trim annulus, arcuately advancing the trim annulus off of said support member.

8. The method of claim 7 in which said log advancing is performed by a pusher upstanding in a log-supporting trough, said pusher being equipped with said support member, said trim annulus arcuate advance being performed by a stripper plate immediately forward in the direction of low travel of said pusher.

9. The method of claim 7 in which said support member includes an arcuate outer surface conforming to the interior of the core, and supporting said core on said arcuate outer surface against deflection stress resulting from log engagement by said saw means.

* * * * *